VARIABLE ELECTRICAL COMPONENT

Filed March 3, 1949 2 Sheets-Sheet 1

INVENTOR.
GEORGE G. BARTOLOMEI
BY John B. Graham
his agent.

VARIABLE ELECTRICAL COMPONENT

Filed March 3, 1949 2 Sheets-Sheet 2

INVENTOR.
GEORGE G. BARTOLOMEI
BY John W. Graham
his agent.

Patented Sept. 26, 1950

2,523,896

UNITED STATES PATENT OFFICE 2,523,896

VARIABLE ELECTRICAL COMPONENT

George G. Bartolomei, Bayville, N. Y., assignor to Specialties, Inc., Syosset, N. Y.

Application March 3, 1949, Serial No. 79,396

12 Claims. (Cl. 171—777)

The present invention generally relates to electrical components having their electrical properties or characteristics variable in value, and is more particularly concerned with such electrical components as rheostats, potentiometers, variable inductances, variable transformers, selector switches and the like.

It has for a principal object to provide such a variable electrical component as specified of new and useful form having many advantageous properties including small size relative to its characteristics or electrical values, long-life in action, smooth contact pressure between the varying element and the variable element and the capability of being totally enclosed to exclude dust, moisture or other injurious media.

Another object of the invention is to provide a new and useful wire-wound electrical component of either linear or non-linear variability in values or characteristics in which the moving element causing the variability has a minimum of frictional contact on the wire of the component and has a wiping action in contact with said wire, to give good electrical conductivity and a minimum of wear on the wire and moving element.

A further object of the invention is to provide a rheostat or potentiometer of wire-wound type having a small size and compact construction, and in which the wire forming the resistance element is smoothly contacted by a moving element with a wiping action and without any additional spring bias other than the actual inherent resiliency of the individual turns of such wire.

Other objects and advantages will be obvious and apparent during the course of the following description.

Generally, in practicing this invention there is provided a variable electrical component having a plurality of turns of wire on a hollow form, the underside at least of the wire being bare. A slot of desired shape or contour through the body of the form permits a spherical member of conducting material such as a metal ball to be passed progressively in contact with the turns of wire by means of a screw which is mounted to rotate in either direction within the hollow body of the form. Due to the rotatory movement which will be given to the sphere or ball by rotation of the screw, the contact of the ball on each wire will be a wiping one and in the direction of the axis of the wire. Furthermore, the spring tension necessary for good continuity of an electric circuit incorporating the variable electrical component according to the present invention is supplied by the resiliency of the wire itself and this can be emphasized, if desired, by flattening that portion of the perimeter of the form where the slot exists to create a decrease of surface of wire to be contacted by the ball, namely to obtain contact of ball and wire at substantially the highest point or peak of the spherical surface of the ball.

In its first embodiment, the invention contemplates a wire-wound component such as a variable resistor, potentiometer, variable inductance or like continuously wound component, suitable contact being made with the ends of the wire and the ball, to serve the variable conditions required. Such a component can be linear or non-linear depending upon the shape or contour given to the slot.

The component can be made quite small, and can readily be completely enclosed for exclusion of moisture, dust and like injurious media.

Another form of non-linear wire-wound component of this same general type is contemplated as a further embodiment of the invention in which the hollow form and the screw are made of complementary frustro-conical shape, the slot in the form being straight or shaped as desired. The ball moving in the slot will progressively contact wires of different diameters and thus of different increments of resistance, for example in a rheostat. The actual ends of the slot may be suitably semi-circularly shaped to fit a semi-spherical contour of ball so that, at the extremity of movements of the ball it can be housed within such contour, and where end caps are used to close off the ends of the form, these shaped portions can conveniently be located beneath the end caps to house the ball thereunder at the extremity of movements, out of contact with the wires.

When in such position further rotation of the screw in the direction which would normally propel the ball beyond the end in which it is housed will rotate the ball against the shoulders formed by the slot and the semi-circular contour, to wipe the ball clear and polish it, for the best electrical continuity possible.

It is a further embodiment of the invention to contemplate a selector switch utilizing the same theory of operation. To this end, each individual wire of the winding on the form is insulated from the others, whereby the ball will progressively establish contact therewith. If the pitch of the teeth of the advancing and retarding screw is correctly chosen, each complete turn of the screw will give a progressive contact of the ball with a wire. While the wires for such a switch can be bodily wrapped around the form, alternatively, they may be bodily carried by the walls of the form across the gap of the slot and into the path of movement of the ball; the main requisite according to the present invention being to tension the wire to be contacted by the moving ball so as to provide the necessary spring contact between wire and ball to make a good connection, but without any additional spring bias other than that given by the tensioned wire.

The actual shape of the form may be altered to suit conditions and the use of the particular variable component.

In the accompanying drawings forming a part of this application, there are illustrated several embodiments of the present invention.

Figure 2:
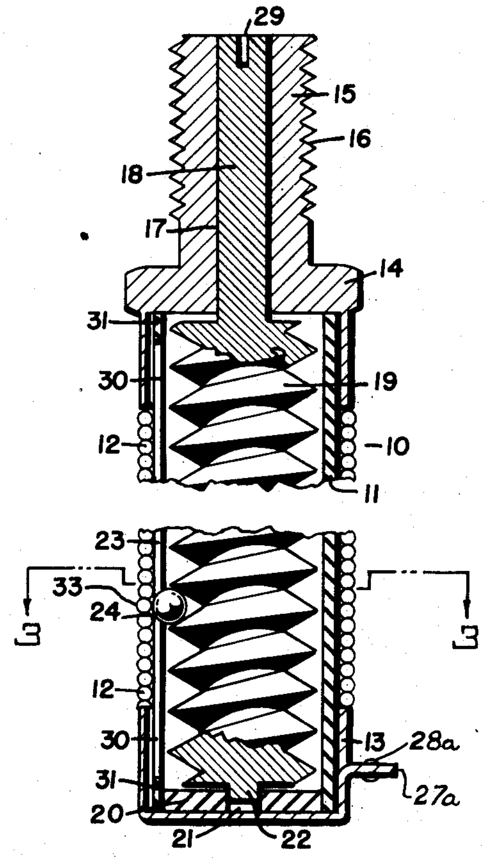
Figure 2 is a cross-section of the electrical component of Fig. 1 taken on the lines 2—2 of Fig. 1.
Figure 1:
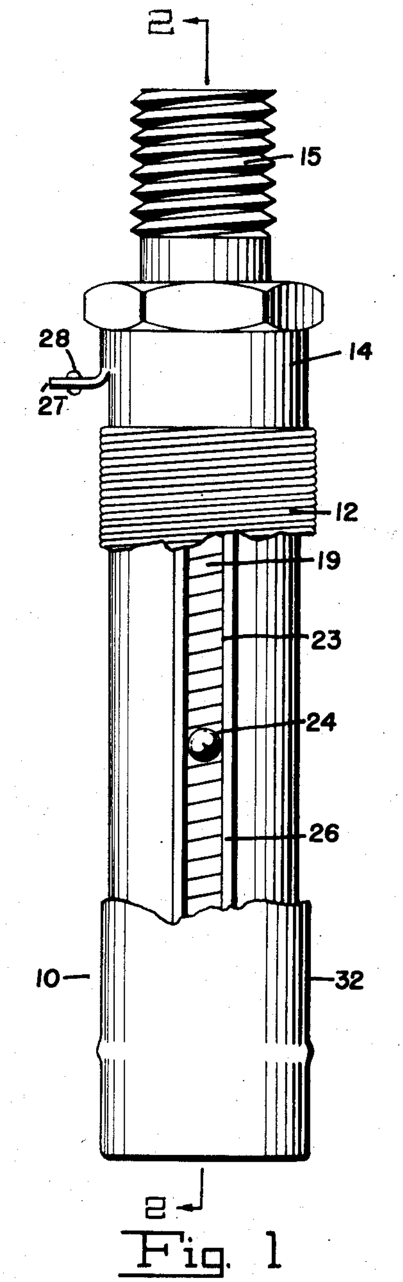
Figure 1 is an elevation on an enlarged scale with parts cut away for clarity, of a new and useful variable linear electrical component forming one embodiment in accordance with the present invention.
Figure 3:
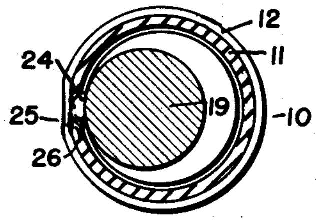
Figure 3 is a cross-section transverse of the electrical component of Fig. 1 and taken on the lines 3—3 of Fig. 2.

Referring now specifically to the illustrated embodiment of Figs. 1, 2 and 3, therein is shown a wire-wound electrical component which in the particular instance comprises a variable resistance or rheostat 10 having a main body portion formed as a hollow cylinder 11 of insulation material upon which there is wound a suitable continuous winding of wire shown at 12. The winding 12 will be of bare wire for the purpose hereinafter brought forth. Cylinder 11 is closed at one end by a cap 13, this cap 13 being a forced-on fit on the body of cylinder 11. At the other end, the cylinder 11 is closed by means of another forced-on cap 14 which has an extension 15 upon which there is a screw thread 16. Screw thread 16 can be utilized for the purpose of mounting rheostat 10 in any desired manner. Extension 15 is bored therewithin at 17 to rotatably seat a shaft 18 drivingly connected with a screw 19 mounted within the body of the cylinder 11 by means of an insulating bushing 20 having a bore therein 21 within which is seated a bearing pin 22 forming a terminal of screw 19. Cylindrical body 11 has a slot 23 extending along one side thereof practically the complete length of the cylinder and parallel with the longitudinal axis thereof.

Within the body of the cylinder 11 there is a metal or like conducting ball 24 of slightly lesser diameter than the width of the slot 23 which ball is carried in the depth or valleys of the threads of screw 19, backward or forward upon rotation of the screw by means of the shaft 18. The dimensions of the slot 23, the dimensions of the threads of the screw 19 and the diameter of the ball 24 are so proportioned that the windings 12 wound upon the cylinder 11, will be progressively contacted by the ball 24 as it is moved along longitudinally of the interior of the cylinder 11 by movements of the screw 19 as it is turned in one or the other direction. In this manner, electrical contact between the ball 24 and the underside of the bare wires of winding 12 will be established, as clearly shown in Fig. 3, the upmost peak of ball 24 being preferably just slightly above the level of the underside of each wire 12 when they are in normal position, so that as the ball is advanced or retarded, the individual wires will ride upon the smooth spherical surface of the ball, to cause the utmost contact possible between them, for adequate electrical continuity in service.

Also, it is preferable that the wires forming winding 12 are wound somewhat tightly upon the cylindrical body 11 whereby, as shown particularly in Fig. 3 a tightly stretched, flat-ended portion 25 will exist across the top of the slot 23. By virtue of the fact that such metallic wire, as is used normally for winding resistors and like electrical components with which this invention is concerned, has a definite resiliency it will thus result that the section 25 stretched across the slot 23 will supply the necessary spring contact for the good electrical connection between the ball 24 and the individual wires 12 as the ball is moved along by screw 19. Furthermore, the normal movements of the ball 24 in the various valleys or depths of the threads or convolutions of the screw 19 would be to follow these convolutions in a helical path, but since the ball 24 is restrained by the sides of slot 23 from following this helical path and is thus caused to travel in a path determined by the shape of slot 23, which in Fig. 1 is longitudinal of the axis of the rheostat 10, it follows that the ball 24 will be rotated on its own axis during such longitudinal movements. This rotation will give a wiping action upon each of the wires of the winding 12 as the ball is progressively moved in contact therewith and this wiping action will be not transverse of the wires as is usual in such rheostats and equivalent components, but actually in the axial direction of each of the convolutions forming the winding 12. This will result in a longer life for a rheostat or like component which in use may be subjected regularly to changes of value since the wire will not be worn down by the constant rubbing action transversely as heretofore usual in such components and the ball will also not be as subject to wear as would a non-rotating member.

It is a further feature of the present invention to emphasize the flatness of the section 25 of the wire 12 for establishing a better electrical contact with ball 24, as shown in Figure 3. To this end, flat sections 26 are formed along side slot 23 tangentially to the perimeter of the cylinder 11, as shown in Figs. 1 and 3, these flat sections 26 being suitably milled or the like upon the cylinder body 11 prior to assembly. When the wires of winding 12 are tightly wound upon the body 11 as previously described the section 25 will be further flattened by laying upon the sections 26, thereby giving a greater area of wire for resiliency and less contact area to the section 25. This will permit the contact of the ball 24 with the individual wires 12 to be greatly enhanced for electrical continuity purposes since the flattened wire at 25 will be more resilient when contacted by the ball giving greater spring contact and the part of the ball which contacts each wire will be the highest peak or point, resulting in less wear on wires and ball.

In order to provide connecting means to the wires of winding 12 a suitable terminal 27 is formed integrally with the body of the cap 14 and to one end, as at 28, an end of the wires 12 will be suitably attached as by soldering. A suitable connecting lug 27*a* is also attached to the cap 13 having the other end of wires 12 soldered thereto, as at 28*a* and by virtue of the insulating washer 20 this will mean that cap 13 is insulated from screw 19, ball 24, cap 14 and the terminal 27. Thus, connection of a circuit between the lug 27*a* on the cap 13 and the terminal 27 on cap 14 will result in a variable resistance in the circuit which can be varied at will between the constructional limits of the rheostat by movement of the ball 14 longitudinally of the rheostat by rotation in one or the other direction of the screw 19 because conducting ball 24 in contact with a wire 12 is in pressure contact with metal screw 19, the shaft 18 of which is in conductive contact with the interior of cap 14, while cap 13 is insulated from the screw by washer 20. In order to facilitate movement of the ball by use of the screw 19 a suitable slit 29 may be formed in the end of the shaft 18 for rotation thereof by means of a screw driver or like tool.

The length of the longitudinal slot 23 with respect to the total length of the rheostat 10 can be chosen as desired, to suit the particular winding of wire 12 thereon. However, it is a feature of the present invention that this slot 23 shall extend below and within the caps 13 and 14 leaving a space 30 as shown in Fig. 2 into which the ball 24 may fall at either end of its travel. In this extreme position the ball will be in electrical contact with either the cap 13 or 14 and will abut against the shoulder 31 formed by the end of the slot which can be semi-circularly shaped to receive the ball 24 if desired. This, therefore, provides a positive stop at each end of the movement of the ball which is extremely desirable to indicate such a condition since the ball is normally hidden from view by the closely wound wires 12. When ball 24 is within the portions 30 and beneath the caps 13 and 14 it will be in electrical connection therewith as is obvious and will not be in contact with any of the wires 12.

In view of the particular construction disclosed, it is possible to totally encase the whole of the rheostat 10 in a suitable plastic envelope shown in part in Fig. 1 at 32. This envelope can be obtained by dipping the whole of the rheostat in a suitable plastic material which thereafter is set in any desired manner. By this means all of the working parts including the ball 24 and the wires 12 together with the screw 19 can be enclosed in a dust-free moisture-proof envelope. Prior to applying the envelope 32, the whole of the interior of the cylinder body 11 can if desired be filled with a suitable lubricant.

A further feature inherent in the present invention is that the ball 24 comprising the moving contact will tend to cleanse itself of any waste or like foreign bodies picked up during its travel, by virtue of its rotation when it is in position below the cap 13 or 14 in the portions of the slot 30. By rotation of the screw 19, the ball 24 will tend to be cleansed by the shoulders 31, since the shoulders will act as scrapers to remove from the ball any material which might mar the good electrical conduction between the ball and the wires 12.

Furthemore, since the wires 12 are bare wires and the underside thereof must remain uncovered the application of the envelope 32 accomplishes a desired result of insulating the tops only of the wires 12 while leaving the underside thereof to be contacted by the ball in good conducting condition.

Desirably, the ball 24 will protrude slightly above the upper edge of the slot 23 whereby as shown at 33 the individual wire 12 which is in direct contact with the highest point of the ball will be slightly forced upwardly and beyond its normal position with the various wires in proximity thereto equally in contact with different portions of the spherical surface of the ball. By this means the greatest contact is established by utilizing the resiliency of the wire in its stretched form as at 25 in Fig. 3. In such a construction it is obvious that the envelope 32 will have to be of somewhat flexible material in order to permit such riding of the wires 12 upwardly upon the ball 24 during its movement. Such construction, however, is not imperative and if desired, the envelope 32 can be made of substantially rigid material, with the ball in somewhat lower position that that shown in Fig. 3, since good contact will be established between the ball and the wires 12 during its movement by virtue of the rotation of the ball and its wiping contact thereby created.

The rheostat or like component hereinbefore described with reference to Figs. 1, 2 and 3 is one which is linear in that the resistance or like value which is varied by means of the ball 24 in contact with the wires 12 is linear in its variabilities. However, it may be desired to have a similar rheostat or like component which is non-linear in form and according to the present invention it is only necessary to alter the shape of the slot 23 which is disclosed in Figs. 1, 2 and 3 as being longitudinal of the axis of the cylinder 11, and form this slot in any desired contour to achieve a desired non-linearity within the limits of construction. To this end, in Fig. 4 there is illustrated another form of rheostat which in this particular case is a non-linear potentiometer comprising a body 35 upon which there will be wound wire (not shown for clarity) in a suitable way similar to the winding 12 on the body 11. Caps 36 and 37 are pressed upon body 35, cap 36 carrying a lug 38 and cap 37 carrying a lug 39 to which will be attached suitable connections to a circuit. Also, lugs 38 and 39 will be attached respectively to the ends of the wire to be wound upon the body 35. A further terminal 40, which can also form the mounting means, if desired, has electrical continuity with the screw 19, the caps 37 and 36 being suitably insulated therefrom. Ball 24 is adapted to be moved along the screw 19 in the same manner as in Fig. 1, by means of a nut 41, which will be suitably attached to the shaft 18 (see Fig. 2). In order to provide a non-linearity with respect to the resistance of the potentiometer, the slot equivalent to the slot 23 is now curved as shown at 42. Thus, the ball 24 traveling within its curved slot 42 partakes of a movement determined entirely by the shape of the slot 42 and by suitably shaping this slot 42 it is possible to obtain any normally desired resistance non-linearity, within the limits of construction of the potentiometer. The potentiometer shown in Fig. 4 can be equally enveloped by a coating 32 similar to Fig. 1 after the windings have been applied in order to obtain a dust-free moisture-proof variable resistor.

Figure 4:
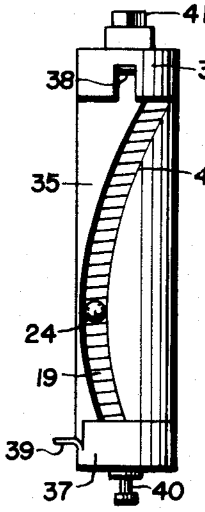
Figure 4 is an elevation of a further embodiment of the present invention showing a variable non-linear electrical component.

It is obvious, that the non-linearity obtained by the potentiometer or the like component in Fig. 4 is limited by the amount of curvature which can be applied to the slot 42 relative to the dimensions of the body member 35 and consequently the construction of Fig. 4 with respect to any electrical component would normally be utilized where the non-linear function is not of any major amount. Where it is desired to have the non-linear function of greater amounts the construction of electrical component shown in Fig. 5 may be utilized, in accordance with the present invention.

Figure 5:
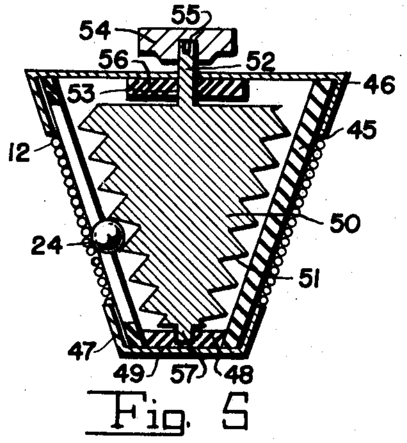
Figure 5 is a cross-section of a further embodiment of the present invention showing another variable non-linear electrical component.

In the embodiment shown in Fig. 5 there is provided a hollow body 45 of frustro-conical shape which is substantially equivalent to the cylindrical body 11 of Fig. 1 in its use and equally will be of insulation material. Suitable caps 46 and 47 close the frustro-conical body 45 as shown, these being a push-on fit on said body. An insulating bushing 48 is provided within cap 47 having a bore 49 therewithin. A screw member 50 is mounted within the body of the member 45. The contour of the screw member 50 is frustro-conical and substantially complementary to the inside surface of the frustro-conical member 45. Screw threads 51 are formed on screw member 50 of such pitch as to be able to carry the ball 24 in the valleys of the threads therealong into contact with wires 12 wound upon the body 45 through a slot 23 formed within one portion of the frustro-conical body and equivalent to the slot 23 in Fig. 1. Rotation of the screw member 50 is obtained by means of a shaft 52 passing through an orifice 53 in the cap 46 and being driven by a knob 54 drivingly mounted on shaft 52 as a press-on fit over a V-cut 55 in the end of the shaft, the other end being supported by a bearing pin 57 rotatably carried within bore 49. A washer 56 serves to take up the slack between the face of the screw 50 and the inside of the cap 46. Thus, by rotation of the knob 54 the ball 24 will be caused to move with respect to the wires 12 through slot 23, and since each winding on the frustro-conical body 45 will have lesser diameter progressively from the base of the member 45 toward the nose, it is obvious that movements of the ball 24 with respect to the wires 12 will cause a non-linear function depending upon the angularity or pitch of the conical portion of the member 45. Suitable terminals (not shown) will be connected to the caps 46 and 47 in order that this component may function as a rheostat or equivalent variable electrical component.

While the shape of slot in Fig. 5 is shown similar to slot 23 of Fig. 1, it is obvious that a shaped slot for the frustro-conical structure similar, for example, to slot 42 of Fig. 4, will give additional non-linearity to the component if this is desired.

Figure 7:
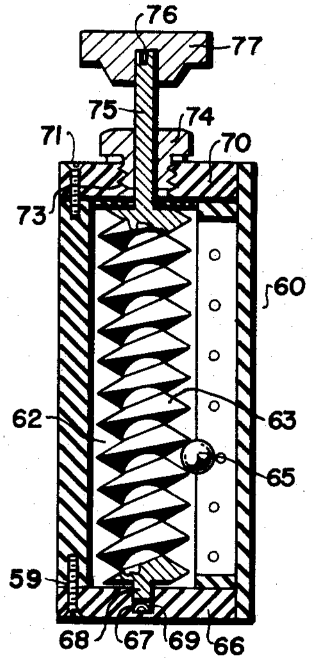
Figure 7 is a cross-section of the electrical component of Fig. 6 taken on the lines 7—7 of Fig. 6.
Figure 6:
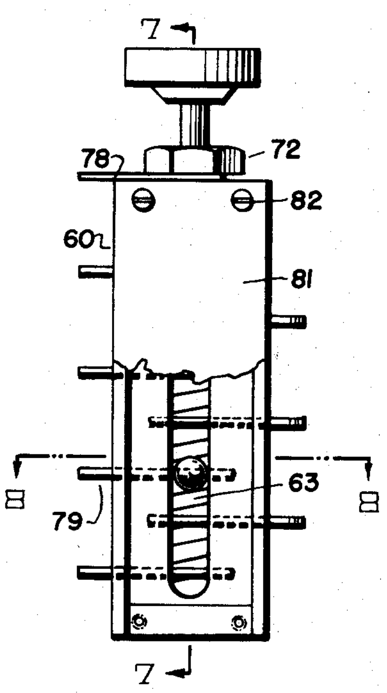
Figure 6 is an elevational view with parts cut away of a further embodiment of the present invention showing an electrical component comprising a selector switch.
Figure 8:
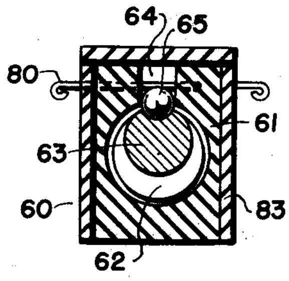
Figure 8 is a cross-section of the electrical component of Fig. 6 taken on the lines 8—8 of Fig. 6.

It is a further feature of the present invention to provide an electrical component of variable form which is adapted for multiple switching such as a selector switch, while utilizing the same principle as that utilized in the rheostat of Fig. 1 and the potentiometers of Figs. 4 and 5. To this end a selector switch 60 is provided as shown in Figs. 6, 7 and 8. Selector switch 60 comprises a main body portion 61 which is bored to form a centrally located circular orifice 62 in which may be carried a screw 63. A slot 64 is cut through the substantial length of body 61 and communicates with the bore 62. Mounted to move along this slot is a ball 65, this being propelled in one or the other direction in the valleys of the thread of screw 63 by rotation of the screw 63. At one end, an end plate 66 is fastened by screws 67 onto the body 61, the end plate 66 having a bore 67 therein into which a bearing pin 68 integral with screw 63 is mounted. A dish-shaped spring 69 is located within the bore 67 to take up any backlash in the movements of the screw 63. At the other end an end plate 70 is mounted on the body member 61 by means of screws 71. End plate 70 is provided with a screw-threaded bore into which is fitted a hollow bored nut 72 having a screw thread 73 and a nut section 74. A shaft 75 integral with screw 63 passes through the bore in the nut section 72 terminating in a V-notch 76 whereby a turning knob 77 may be frictionally engaged therewith in order to cause the screw to be rotated one way or the other to move the ball 65 longitudinally of the body 61, through said slot 64. A terminal 78 is held in position by nut portion 74 and forms one contact of the electrical component. In order to form the individual contacts which are to be selectively contacted by ball 65, during its longitudinal movements in slot 64 there are formed a plurality of wires 79, more clearly shown in the cross-section of Fig. 8.

Wires 79 are selected of sufficient resiliency so that when they are stretched across the gap formed by slot 64 they will assert the necessary tension on ball 65 when in contact therewith. The wires 79 are embedded in a wall of body portion 61 at one end, as shown in Fig. 6, and thereafter protrude externally of another wall.

Each individual wire is shaped to first pass across the slot 64 in a position slightly below the highest point of the ball 65 and is force-fitted into one wall. Thereafter it is bent to form terminals 80 at its other end to which may be connected the individual circuits to be controlled. As the ball 65 is progressively moved along the slot 64 by means of screw 63 and knob 77, it will progressively make contact with the spaced wires 79 at the point where these stretch across the slot 64. Thus there will be established selectively a plurality of circuits between the terminal 78 and the individual terminals 80. Furthermore, if the pitch of the screw 63 is correctly proportioned with respect to the spacing of the individual wires 79, then it is possible to so arrange the selector switch 60 that for one complete revolution of the screw, namely one complete revolution of the turning knob 77, each of the individual wires 79 will be in turn contacted by the ball 65. If other relative conditions apply, more or less than one revolution of the switch may be needed for the progressive contact of wires 79. In order to close the slot 64 a cover plate 81 is attached by screws 82 to the body 61. Side plates 83 may be suitably attached to the body 61, to cover that portion of the wires 79 which need not be exposed and help to firmly fix the wires in position.

Figure 9:
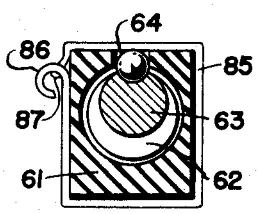
Figure 9 is a cross-section similar to Fig. 8 but showing a slightly different way of forming the individual turns of wire of the switch of Figs. 6 and 7.

While in Figs. 7 and 8 the contact wires 79 have been shown as forced into the body 61 of the switch and thus held and formed as the tensioned wires which are contacted by the ball 65, it is obvious that the principles disclosed particularly in Fig. 3 can be utilized for this switch. Figure 9 is a cross-section of such a switch, equivalent to the switch of Figs. 6, 7 and 8 but wherein the wires 85 are tightly wound about the body 61 of the switch and end in terminals 86 to which may be connected the various wires forming the one leg of the selective switching circuits, the other leg of each circuit being provided by means of the terminal 78, shown in Fig. 6. The wires 85 may each be joined together by soldering as at 87 with the terminals 86 each soldered in, as shown. The necessary tension of the wires 85 at the point where they extend over slot 64 can be obtained by twisting wires 85 on themselves or by selecting a heavy enough wire for wires 85 with good resilient properties. Obviously, also the wires 85 could be arranged within slots within the body 61 or shallow grooves which would hold them in position relative to each other, determine accurate spacing and provide insulation between the various wires 85.

Figure 10:
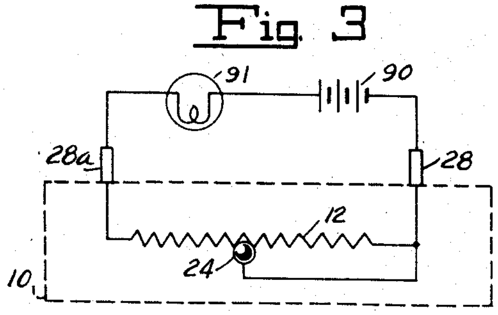
Figure 10 is a diagrammatical illustration of a rheostat according to the present invention introduced into an electrical circuit.

Referring now to Figure 10, the rheostat 10 is shown in a circuit conventionally comprising a battery 90 and a tungsten filament lamp 91 connected by leads 92 to the lugs 28 and 28a of rheostat 10. When ball 24 is moved, as hereinbefore described, the effective resistance of the wire 12 will be changed thus changing the circuit characteristics.

Thus, in accordance with all embodiments of this invention, as hereinbefore described, there is provided a variable electrical component, the essential variability of which is obtained by causing a metal ball or like spherical conductor to be progressively moved into contact with a plurality of wires, these wires being resiliently held upon a form in which there is formed a slot, the slot determining the particular path to be taken by the ball as it is moved in contact with the wires forwardly or backwardly within the body of the form by means of the screw member carrying the ball in its threads.

The advantages of the construction of component according to the present invention are many. It is obvious that due to the use of a ball working within a slot and driven by the threads of a screw member, the increments of movement bodily of the ball relative to the wires can be extremely small.

Also, since the wire is wound externally of the form, greater heat dissipation is obtained when used for a resistor for example. Furthermore, there is a positive positioning without backlash obtained which can be termed self-locking in the position of the ball relative to the wires.

With respect to the switch form of component, while only one ball 65 has been shown in the slot 64 and carried by screw 63, it is obvious that for multiple switching purposes, more than one ball could be carried by the screw. By this means, several selective circuits can be operated by rotating screw 63 to move each ball, equivalent to 65, relative to its group of wires 80, the balls being spaced apart initially as desired.

Having thus described my invention, I claim:

1. A variable electrical component of the type described combining in combination a hollow form; a shaped slot in said form; a screw mounted within said form for rotation in either direction; a spherical member of conducting material carried by the threads of said screw within the form with a portion of said spherical member embraced by said slot, whereby rotation of said screw will cause said ball to follow a path determined by the shape of said slot; and a plurality of tensioned wires carried by said form across the gap caused by said slot, into position to be contacted selectively by said ball during its path of movement along said slot, said wires having their undersides at least bare of insulation for permitting establishment of electrical conductivity with said ball.

2. A variable electrical component of the type described combining in combination a hollow form; a shaped slot in said form; a screw mounted within said form for rotation in either direction; a spherical member of conducting material carried by the threads of said screw within the form with a portion of said spherical member embraced by said slot, whereby rotation of said screw will cause said ball to follow a path determined by the shape of said slot; and a plurality of tensioned wires carried by said form across the gap caused by said slot, into position to be contacted selectively by said ball during its path of movement along said slot, said wires having their undersides at least bare of insulation for permitting establishment of electrical conductivity with said ball, each of said wires being insulated from the others and having an external connection for establishing selective switching circuits between said ball and said wires.

3. A variable electrical component of the type described combining in combination a hollow form; a shaped slot in said form; a screw mounted within said form for rotation in either direction; a spherical member of conducting material carried by the threads of said screw within the form with a portion of said spherical member embraced by said slot, whereby rotation of said screw will cause said ball to follow a path determined by the shape of said slot; and a plurality of tensioned wires carried by said form across the gap caused by said slot, into position to be contacted selectively by said ball during its path of movement along said slot, said wires having their underside at least bare of insulation for permitting establishment of electrical conductivity with said ball; said wires being formed as a continuous winding on said form and having connecting terminals at each end of the continuous winding for establishing a variable characteristic between the terminals and said ball.

4. A variable linear electrical component of the type described comprising in combination a hollow insulating cylindrical form; a straight longitudinal slot therein for a major portion of the length of the form; a flattened surface alongside said slot on each side thereof; a continuous winding of bare wire upon said form and covering said slot, said winding being wound under tension to stretch portions of each turn over said slot in a flat contour emphasized by said flattened surfaces; a pair of end caps on said form as a pressed-on fit; terminals on said end caps to each of which an end of said winding is connected; a screw mounted for rotation in either direction within said form, said end caps mounting said screw for rotation; an insulating bushing in one end cap to insulate said screw therefrom; and a ball of conducting material carried by said screw with a part thereof within said slot and guided to move longitudinally of said form by the sides of said slot progressively into contact with portions of wire stretched over said slot, in one or the other direction.

5. A variable electrical component of the type described comprising in combination a hollow insulating cylindrical form; a longitudinal slot therein; a winding of bare wire upon said form and covering said slot, said winding being wound under tension to stretch portions of each turn over said slot in a flat contour, a pair of end caps on said form; a screw mounted for rotation in either direction within said form, said end caps mounting said screw for rotation; and a ball of conducting material carried by said screw with a part thereof within said slot and guided to move longitudinally of said form by the sides of said slot progressively into contact with portions of wire stretched over said slot, in one or the other direction.

6. A variable electrical component as claimed in claim 5 wherein said caps overlying the extremities of said slot whereby at extreme ends of movement, said ball will fall within said extremities and under said caps out of electrical contact with said wires.

7. A variable electrical component as claimed in claim 5 wherein said slot terminates at each end in a semi-circularly shaped portion complementary to a semi-spherical contour of said ball and extends along said form to a position beneath each of said caps, whereby said ball is held in said shaped portion at either extremity and can be wiped against the shoulders formed thereby to cleanse the ball, by rotation of said screw in the direction which would normally force the ball outwardly from the interior of the form.

8. A variable electrical component as claimed in claim 1 in which the whole of the component is encased in a flexible plastic envelope, to seal the interior thereof from contamination.

9. A variable non-linear electrical component of the type described comprising in combination a hollow insulating form; a curved slot therein of predetermined contour; a winding of bare wire upon said form and covering said slot, said winding being wound under tension to stretch portions of each turn over said slot in a flat contour; a pair of end caps on said form; terminals on said end caps to each of which an end of said winding is connected; a screw mounted for rotation in either direction within said form, said end caps mounting said screw for rotation; and a ball of conducting material carried by said screw with a part thereof within said curved slot and guided to move in the path determined by the sides of said slot progressively into contact with portions of wire stretched over said slot, in one or the other direction, the desired non-linearity being determined by the shape given to said slot.

10. A variable non-linear electrical component of the type described comprising in combination a hollow insulating cylindrical form; a curved slot of predetermined contour therein for a major portion of the length of the form; a flattened surface alongside said slot on each side thereof; a continuous winding of bare wire upon said form and covering said slot, said winding being wound under tension to stretch portions of each turn over said slot in a flat contour emphasized by said flattened surfaces; a pair of end caps on said form as a pressed-on fit; terminals on said end caps to each of which an end of said winding is connected; a screw mounted for rotation in either direction within said form, said end caps mounting said screw for rotation; an insulating bushing in one end cap to insulate said screw therefrom; and a ball of conducting material carried by said screw with a part thereof within said curved slot and guided to move in the path determined by the sides of said slot progressively into contact with portions of wire stretched over said slot, in one or the other direction, the desired non-linearity being determined by the shape given to said slot.

11. A variable non-linear electrical component of the type described comprising in combination a hollow insulating frustro-conical form; a slot therein for a portion of the length of the form; a winding of bare wire upon said form and covering said slot, said winding being wound under tension to stretch portions of each turn over said slot in a flat contour; a pair of end caps on said form; terminals on said end caps to each of which an end of said winding is connected; a frustro-conical screw mounted for rotation in either direction within said form, said end caps mounting said screw for rotation; and a ball of conducting material carried by said screw with a part thereof within said slot and guided to movement longitudinally of said form by the sides of said slot progressively into contact with portions of wire stretched over said slot, in one or the other direction.

12. A variable non-linear electrical component of the type described comprising in combination a hollow insulating frustro-conical form; a straight longitudinal slot therein for a major portion of the length of the form; a flattened surface alongside said slot on each side thereof; a continuous winding of bare wire upon said form and covering said slot, said winding being wound under tension to stretch portions of each turn over said slot in a flat contour emphasized by said flattened surfaces; a pair of end caps on said form as a pressed-on fit; terminals on said end caps to each of which an end of said winding is connected; a frustro-conical screw mounted for rotation in either direction within said form, said end caps mounting said screw for rotation; an insulating bushing in one end cap to insulate said screw therefrom; a ball of conducting material carried by said frustro-conical screw with a part thereof within said slot and guided to movement longitudinally of said form by the sides of said slot progressively into contact with portions of wire stretched over said slot, in one or the other direction, and turning means external of said component drivingly attached to said screw to rotate same in either direction to vary the characteristics of the component in a non-linear manner.

GEORGE G. BARTOLOMEI.

REFERENCES CITED

The following references are of record in the file of this patent:

UNITED STATES PATENTS

| Number | Name | Date |
|---|---|---|
| 2,127,322 | Blomberg | Aug. 16, 1938 |